US007853869B2

(12) United States Patent
Gurcan et al.

(10) Patent No.: US 7,853,869 B2
(45) Date of Patent: Dec. 14, 2010

(54) CREATION OF SEMANTIC OBJECTS FOR PROVIDING LOGICAL STRUCTURE TO MARKUP LANGUAGE REPRESENTATIONS OF DOCUMENTS

(75) Inventors: Ahmet Gurcan, Mercer Island, WA (US); Eric Stanfield Leese, Seattle, WA (US); Jerry Jay Dunietz, Seattle, WA (US); Oliver Foehr, Mercer Island, WA (US); Jesse McGatha, Sammamish, WA (US); Khaled Sedky, Sammamish, WA (US); Ming Liu, Redmond, WA (US); Rodrigo Lopez, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1099 days.

(21) Appl. No.: 11/302,639

(22) Filed: Dec. 14, 2005

(65) Prior Publication Data

US 2007/0136660 A1    Jun. 14, 2007

(51) Int. Cl.
*G06F 17/00* (2006.01)
(52) U.S. Cl. .................... 715/234; 715/256
(58) Field of Classification Search .............. 707/1; 715/234, 235, 236, 237, 239, 241, 256
See application file for complete search history.

(56) References Cited

U.S. PATENT DOCUMENTS

| 5,526,477 | A  | * | 6/1996  | McConnell et al. ......... 345/467 |
| 5,640,468 | A  |   | 6/1997  | Hsu |
| 5,784,487 | A  |   | 7/1998  | Cooperman |
| 5,819,086 | A  |   | 10/1998 | Kroenke |
| 6,493,735 | B1 | * | 12/2002 | Kumhyr ..................... 715/236 |
| 7,639,257 | B2 | * | 12/2009 | Renner ....................... 345/467 |
| 2001/0035876 | A1 | * | 11/2001 | Crain et al. ................. 345/744 |
| 2001/0043349 | A1 | * | 11/2001 | Bobrow et al. ............. 358/1.12 |
| 2002/0046198 | A1 |   | 4/2002  | Hitt |
| 2002/0059265 | A1 | * | 5/2002  | Valorose, III ............... 707/100 |
| 2002/0078051 | A1 | * | 6/2002  | Ullmann ..................... 707/10 |
| 2002/0129061 | A1 |   | 9/2002  | Swart et al. |
| 2003/0081836 | A1 |   | 5/2003  | Averbuch et al. |
| 2003/0123737 | A1 |   | 7/2003  | Mojsilovic et al. |
| 2004/0114258 | A1 | * | 6/2004  | Harris et al. ................ 359/841 |

(Continued)

OTHER PUBLICATIONS

"Support for XML Markup of Image-based Electronic Editions", Alex Dekhtyar, Ionut E. Iacob, Jerzy W. Jaromczyk, Kevin Kiernan, Neil Moore, Dorothy Carr Porter, International Journal on Digital Libraries, 2004, 17 pgs. http://dblab.csr.uky.edu/~eiaco0/publications/JDL2004.pdf.

(Continued)

*Primary Examiner*—Laurie Ries

(57) ABSTRACT

Semantic objects are created that provide a structure for markup language representations of documents. The semantic objects include text runs that are produced from the markup language representation and that are placed into semantic blocks that group text runs according to how text is logically structured in the document being represented. The text runs of each semantic block are ordered to correspond to the logical order of the document being represented. The semantic blocks corresponding to each page of the document being represented are ordered to correspond to the logical order of the document being represented. The ordered semantic blocks including the ordered text runs are saved as a semantic object which can they be utilized to make use of the logical structure of the document being represented by the markup language.

20 Claims, 11 Drawing Sheets

U.S. PATENT DOCUMENTS

2004/0146198 A1    7/2004  Herley
2004/0193520 A1    9/2004  LaComb et al.
2005/0028090 A1*   2/2005  Sweet et al. ............... 715/513
2005/0050459 A1    3/2005  Qu
2005/0216836 A1*   9/2005  Duke et al. ............... 715/531

OTHER PUBLICATIONS

"An overview of cross-platform document technology", Darren Foltinek, Crewes Research Report - vol. 8 (1996), 7 pgs. http://www.crewes.org/Reports/1996/1996-30.pdf.

"Automatic Model-Based Semantic Object Extraction Algorithm", Jianping Fan, Xingquan Zhu and Lide Wu, IEEE Transactions on Circuits and Systems for Video Technology, vol. 11, No. 10, Oct. 2001, 12 pgs. http://www.cs.uvm.edu/~xqzhu/publications/csvt01.pdf.

"XML Paper Specification Patent License", Feb. 17, 2006, 2 pgs. Reprinted from the Internet at: http://www.microsoft.com/whdc/xps/spxpatentlic.mspx.

* cited by examiner

```
<FixedPage Width="816" Height="1056" >
902⁀<Glyphs Fill="#ff000000" FontUri="/font_2.TTF"
     FontRenderingEmSize="10.00" OriginX="550.24" OriginY="254.24"
     UnicodeString="it contains some italic text" />
904⁀<Glyphs Fill="#ff000000" FontUri="/font_1.TTF"
     FontRenderingEmSize="10.00" OriginX="246.24" OriginY="254.24"
     UnicodeString="This is a two line paragraph and" />
906⁀<Glyphs Fill="#ff000000" FontUri="/font_3.TTF"
     FontRenderingEmSize="10.00" OriginX="350.24" OriginY="270.24"
     UnicodeString="bold text" />
908⁀<Glyphs Fill="#ff000000" FontUri="/font_1.TTF"
     FontRenderingEmSize="10.00" OriginX="246.24" OriginY="270.24"
     UnicodeString="as well as some" />
</FixedPage>
```

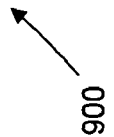

FIG. 9

CREATION OF SEMANTIC OBJECTS FOR PROVIDING LOGICAL STRUCTURE TO MARKUP LANGUAGE REPRESENTATIONS OF DOCUMENTS

BACKGROUND

Documents of specific applications may be represented in a more universal form by representation via a markup language. For example, documents may be converted into an extensible markup language (XML) paper specification (XPS) format whereby the XPS format may then be displayed and printed. The XPS markup provides the information necessary to render the document as it was intended in its original form.

It may be desirable to utilize the XPS document for additional purposes beyond display and printing. For example, it may be desirable to copy text from an XPS document in order to paste it elsewhere. However, during generation of the XPS document such as via an XPS virtual printer driver, the logical structure of the original document is lost to the extent it differs from the order of information within the XPS markup. Losing the logical structure means that selection of information within the XPS document may not function correctly as the order for the selection to progress follows the markup order which may not be the correct order, copy/paste functions may not function correctly due to the problem with selecting information, and searches of information may not function correctly. Furthermore, the screen reader relies on the logical order of the document to read it correctly for user interface automation and accessibility such that the user interface will not function properly when that logical order is missing from the markup.

SUMMARY

Embodiments address these issues and others by providing for the creation of a semantic object that specifies a logical structure of the markup language representation of the document. The semantic object model includes text runs produced from glyphs of the markup language representation. The text runs are grouped into corresponding semantic blocks that correspond to paragraphs of a page of the original document. The text runs are ordered within each of the semantic blocks in accordance with the order of the text runs within the original document. The semantic blocks are then ordered on the page in accordance with the order of the paragraphs within the original document. The ordered semantic blocks containing the ordered text runs are maintained in memory or physical storage as the semantic object which may be referred to when performing operations beyond the display and printing of the original document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 9 shows an example of an XPS markup for the paragraph of FIG. 8.

DETAILED DESCRIPTION

Embodiments create a semantic object that defines a logical structure for a markup language representation, e.g., XPS document, of an original document. The logical structure defined by the semantic object corresponds to the logical structure of the original document. The semantic object may be referenced when performing a task with the markup version being displayed, such as selecting, searching, or copying and pasting.

Figure 1:
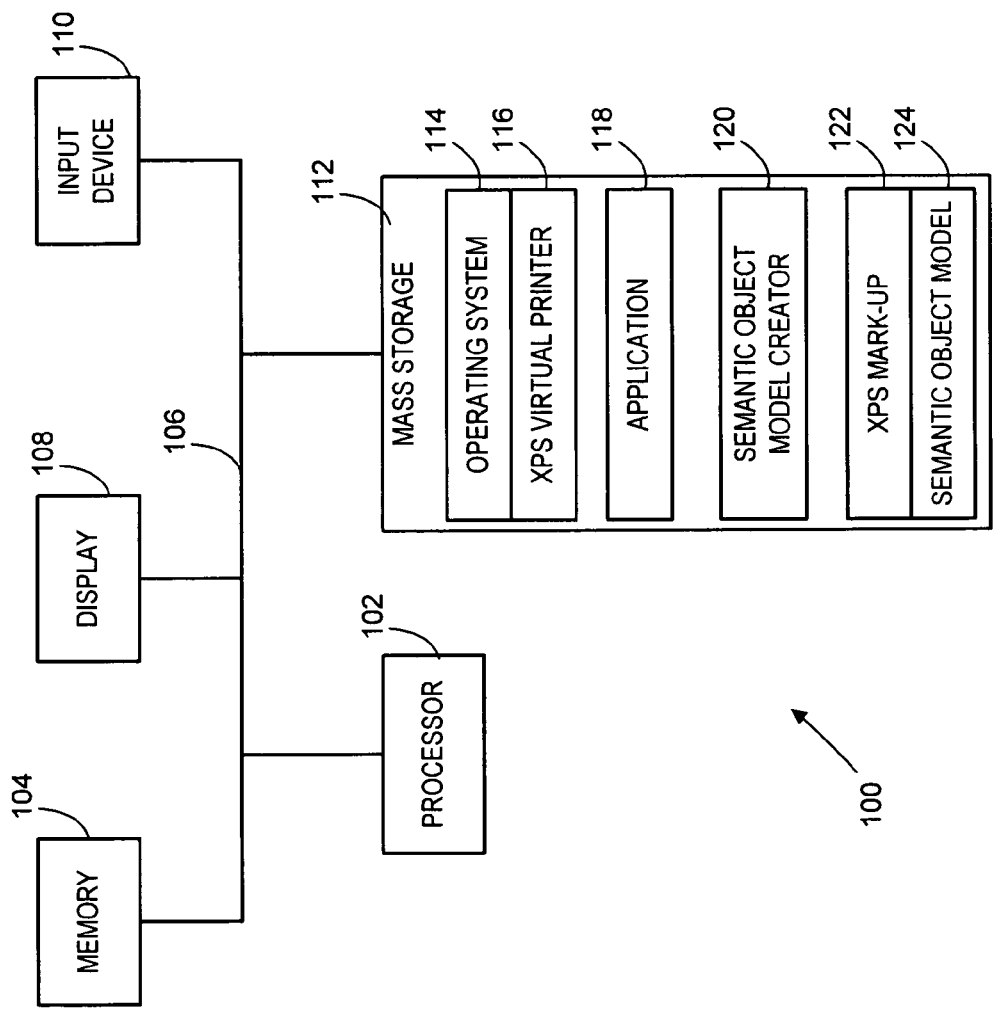
FIG. 1 shows an example of a computer system for implementing embodiments.

FIG. 1 shows an example of a computer system 100 that provides an operating environment for the embodiments. The computer system 100 as shown may be a standard, general-purpose programmable computer system 100 including a processor 102 as well as various components including mass storage 112, memory 104, a display adapter 108, and one or more input devices 110. The processor 102 communicates with each of the components through a data signaling bus 106. The computer system 100 may alternatively be a hard-wired, application specific device that implements one or more of the embodiments.

In the example, of FIG. 1, the processor 102 implements instructions stored in the mass storage 112 in the form of an operating system 114. To provide markup language representations of documents, such as an XPS document representing an original document, an XPS virtual printer driver 116 is included as a resource that may be utilized by applications operating in conjunction with the operation system 114, such as application 118. The application 118 may be utilized to generate an original document that is specific to the application 118, and the XPS virtual printer driver 116 may be called upon to produce an XPS document file 122 that is a markup language representation of the original document. The mass storage 114 also includes a semantic object model creator module 120 which acts upon the markup language representation 122 to produce a semantic object model 124.

When generating an XPS document 122 via the XPS virtual printer driver 116, the logical structure of the original document is lost to the extent it differs from the order of the markup. However, the semantic object model creator module 120 is called upon to derive the logical structure from the information within the markup 122 in order to generate the semantic object model 124 that provides an approximation of the logical structure of the original document. Various figures and related discussion are provided to illustrate the operational flow of the semantic object creator module 120. However, it should be appreciated that the screenshots and operational flow are provided only for the purposes of illustration and are not intended to be limiting of the scope of the claims set forth below.

The application of an XPS virtual printer driver 116 to create the markup is provided only for the purposes of illustration. There are other ways in which an XPS markup may be generated from an original document and the logical structure of the original document is lost. For example, third-party applications may implement an XPS export functionality to create an XPS document from an original document.

The computer system 100 of FIG. 1 typically includes a variety of computer readable media. Computer readable media can be any available media that can be accessed by computer 100 and includes both volatile and nonvolatile media, removable and non-removable media. By way of example, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
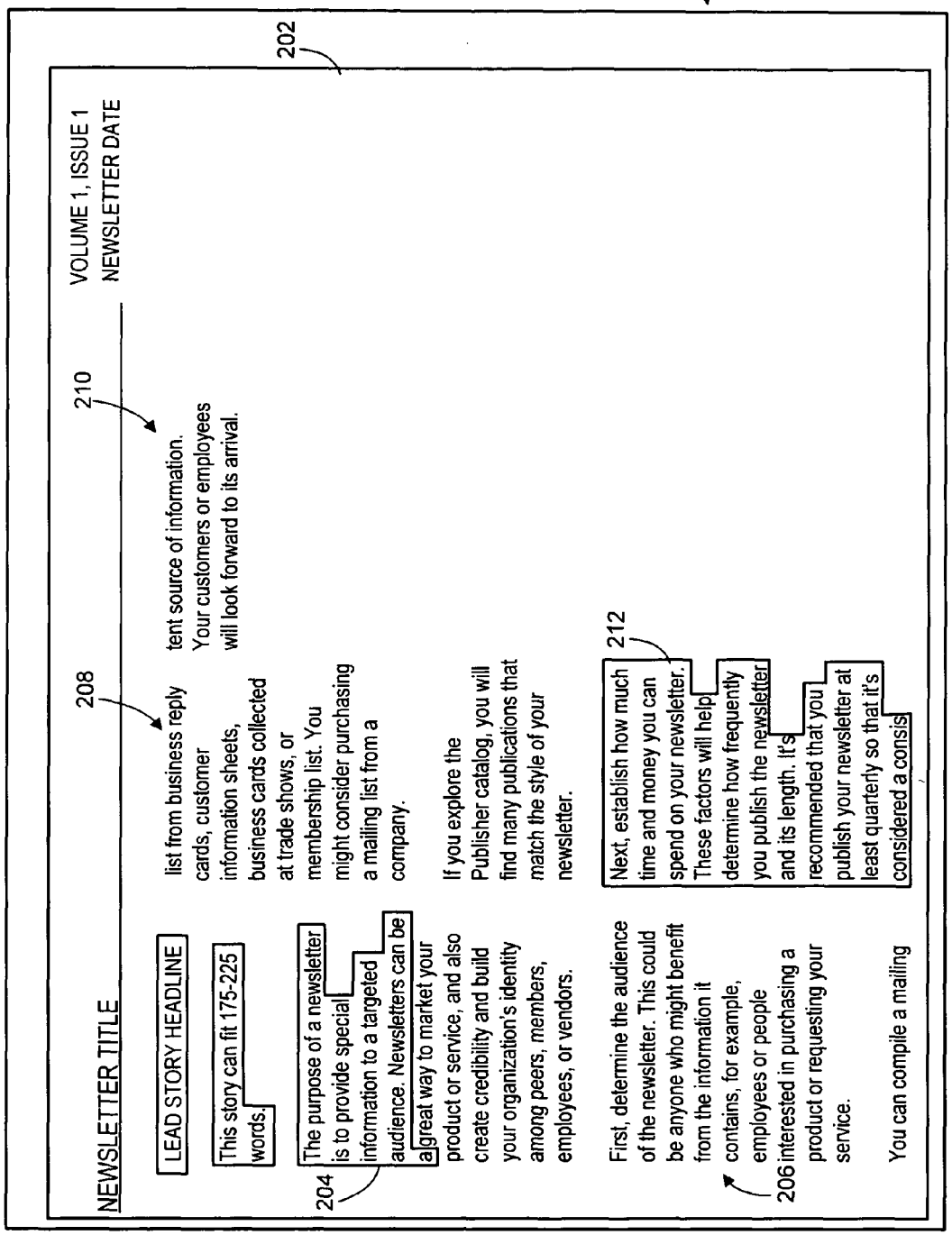
FIG. 2 shows an example of selection occurring within an XPS document where the selection results in an incorrect grouping of paragraphs.

FIG. 2 shows a screenshot 202 of the XPS markup 122 displayed within an XPS viewer without the benefit of the semantic object 124 having been previously constructed. This screen 202 includes three columns of text, a first column 206, second column 208, and third column 210. In this example, the user has attempted to select a continuous amount of text within the XPS document 122 by using a mouse or keyboard as a selection tool, such as starting at the second paragraph 204. However, rather than obtaining a continuous selection in memory as would be expected, the second paragraph 204 of the story "Lead Story Headline" is selected into memory and is followed by the seventh paragraph 212 on the second column 208 instead of the third paragraph on the first column 206 because the order of content within the markup document 122 may dictate the order in which the information is copied into memory and this order of content differs from the logical order of the original document which is the order in which it is displayed.

Figure 3:
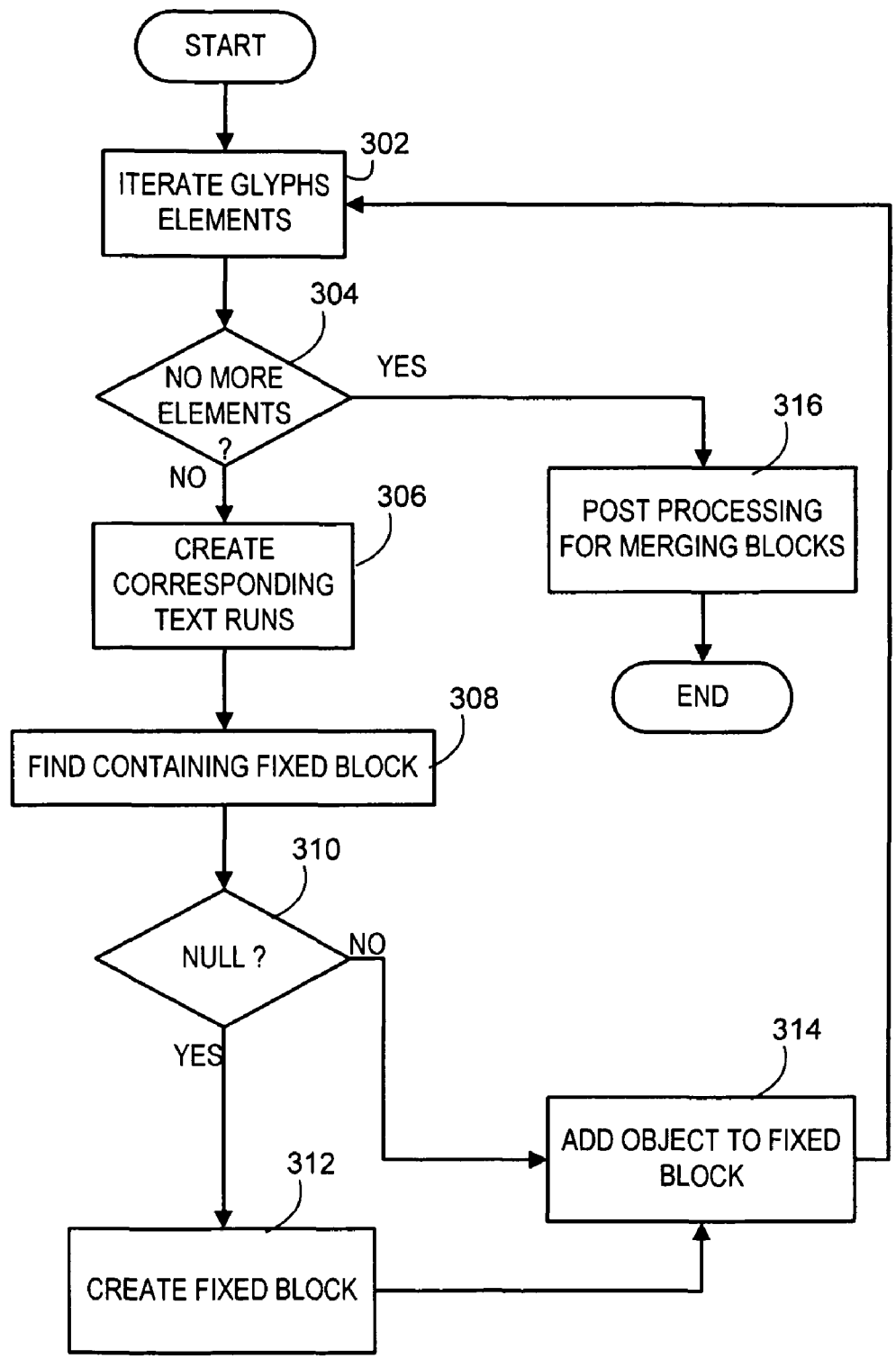
FIG. 3 shows an example of the operational flow of a semantic object creation routine.

FIG. 3 shows an operational flow that when performed groups text runs into fixed semantic blocks that correspond to paragraphs. The operational flow begins at glyphs operation 302. Here, glyphs of the markup 122 are extracted for purposes of creating text runs. Examples of glyphs of the markup language representation 122 are shown in FIG. 9, which is discussed in more detail below. Upon attempting to extract the glyphs, query operation 304 detects whether there were any elements of the markup 122 to be extracted. If there are no more, then operational flow proceeds to merge operation 316 which is discussed below as all text runs have been accounted for. If there are more elements, then operational flow proceeds to text run operation 306 where a current text run is created from the extracted glyphs. The text run is a memory representation of a Glyphs markup element, but it can refer to partial Glyphs elements as well. For example, if there is a Glyphs element in the markup that has wide spaces between words, this might mean that a single markup element (Glyphs) contains more than one semantic entity. Thus, when creating text runs, reference may be made to parts of an individual Glyphs element by start and end indices. Once a text run has been created, an attempt is made to place the text run with a fixed semantic block.

The process of assigning a current text run being considered to an existing semantic block occurs in block operation 308. Here, a series of decisions are made based on the application of heuristics to determining whether the current text run belongs to one of the semantic blocks, where the semantic blocks are representative of individual paragraphs of the original document. Query operation 310 detects whether the block operation 308 has a null output. If not, then the current text run is added to the current semantic block being considered at addition operation 314. If the output is null, then a new semantic block is created in memory at create operation 312. Operational flow then returns to glyphs operation 302 to extract additional glyphs for constructing the next text run.

Merge operation 316 involves considering whether semantic blocks that have been created may be merged to form a single semantic block or whether a single semantic block should be broken into multiple blocks. Merge operation 316 involves spatial considerations.

As a first consideration during post processing 316, if two semantic blocks intersect, or one is inside the other, then an assumption may be made that these two blocks should be merged into one block in memory. The most common case for such an occurrence is when content of the markup is very disordered and two or more semantic blocks are created for one paragraph, and text runs are distributed inside those multiple blocks. As a second consideration during post processing 316, each semantic block is analyzed line by line to determine whether or not the width of the first word of that line and the width of the space character is smaller than a gap in the previous line. If the width of the first word and the width of the space character is smaller than the gap, then this semantic block representing one paragraph is broken into two semantic blocks representing two separate paragraphs.

Figure 4:
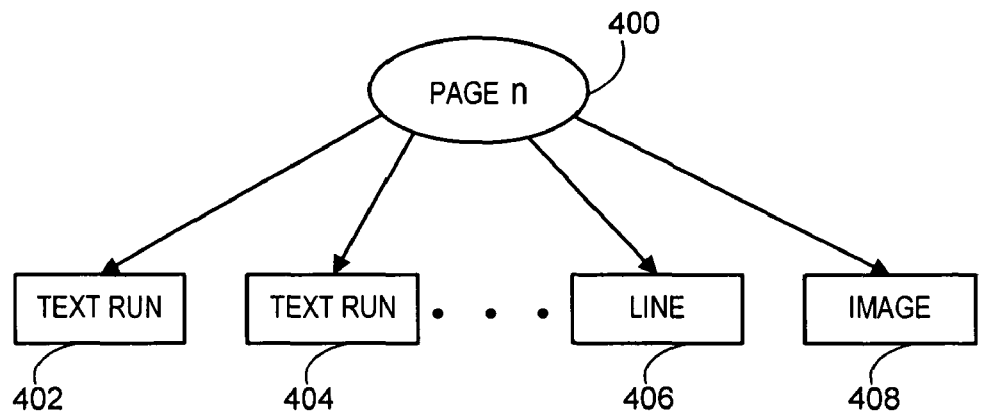
FIG. 4 shows an example of the contents of a page of the semantic object upon producing text runs and prior to grouping the text runs within semantic blocks.
Figure 5:
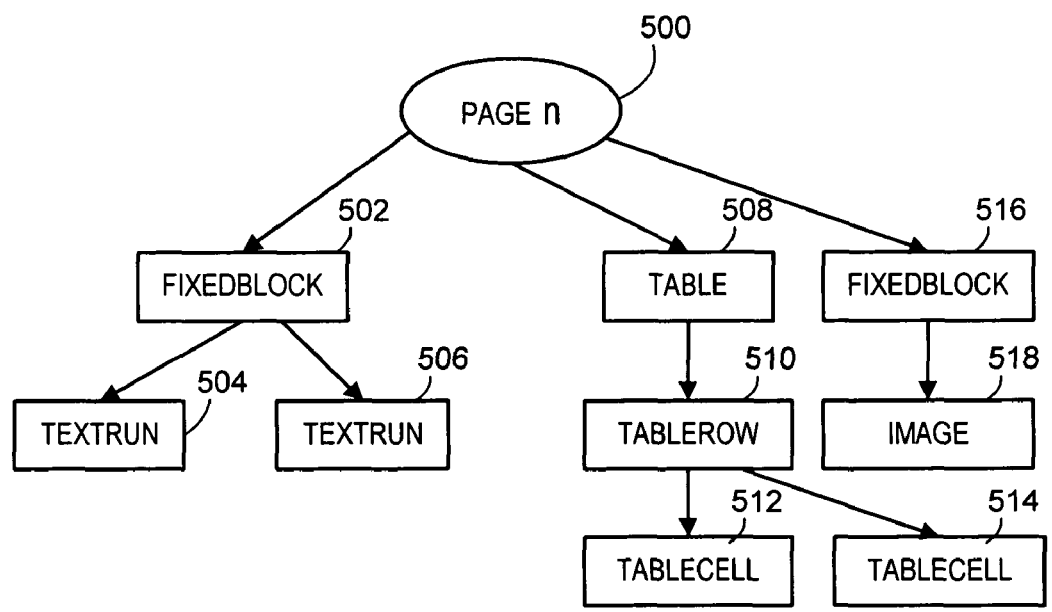
FIG. 5 shows an example of the contents of a page of the semantic object upon grouping text runs and images into fixed semantic blocks corresponding to paragraphs and tables.
Figure 6:
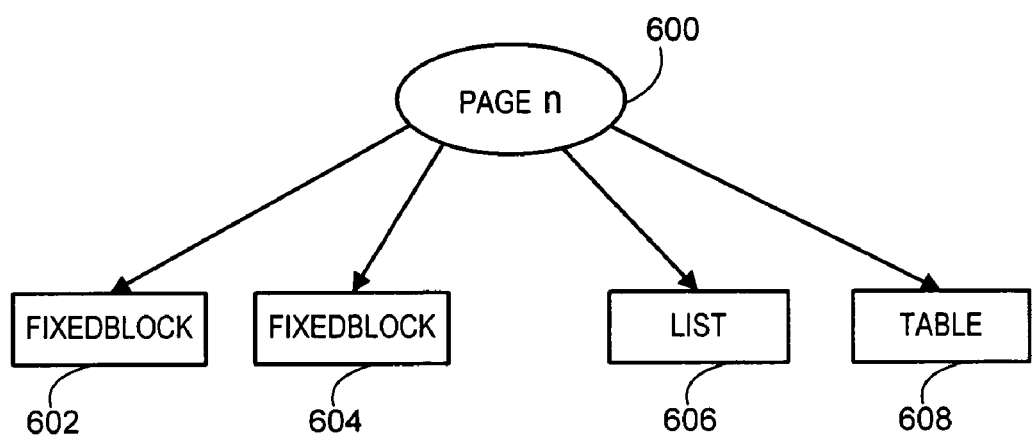
FIG. 6 shows an example of the contents of a page of the semantic object upon merging remaining blocks.

FIGS. 4-6 show a bottom-up approach to constructing the semantic object model 124 from the individual elements of the markup 122. FIG. 4 shows an example of a page 400 whose logical structure is being constructed. At the lowest level of building blocks, there are text runs 402, 404 that have been created from glyphs of the markup 122 as discussed above. The markup 122 may also provide for additional elements including lines 406 and images 408. As shown, at this point the semantic object is a flat semantic tree.

FIG. 5 shows an example of the page 500 upon the completion of one or more iterations of the operational flow of FIG. 3, where fixed blocks including fixed block 502 have been created and where fixed block 502 includes text runs 504 and 506 that correspond to the same paragraph. Likewise, a table 508 having a row 510 and cells 512 and 514 has been created and another fixed block 516 including an image 518 has been created. FIG. 6 shows an example of the page 600 upon the completion of the merge operation 316, where multiple fixed blocks have been merged due to determining that they logically correspond to the same paragraph, which results in a first fixed block 602, a second fixed block 604, a list 606, and a table 608.

In relation to FIGS. 5 and 6, the construction of tables, images within fixed blocks, and lists occurs via processes similar to those discussed herein. However, those processes are beyond the scope of the present application.

Figure 7:
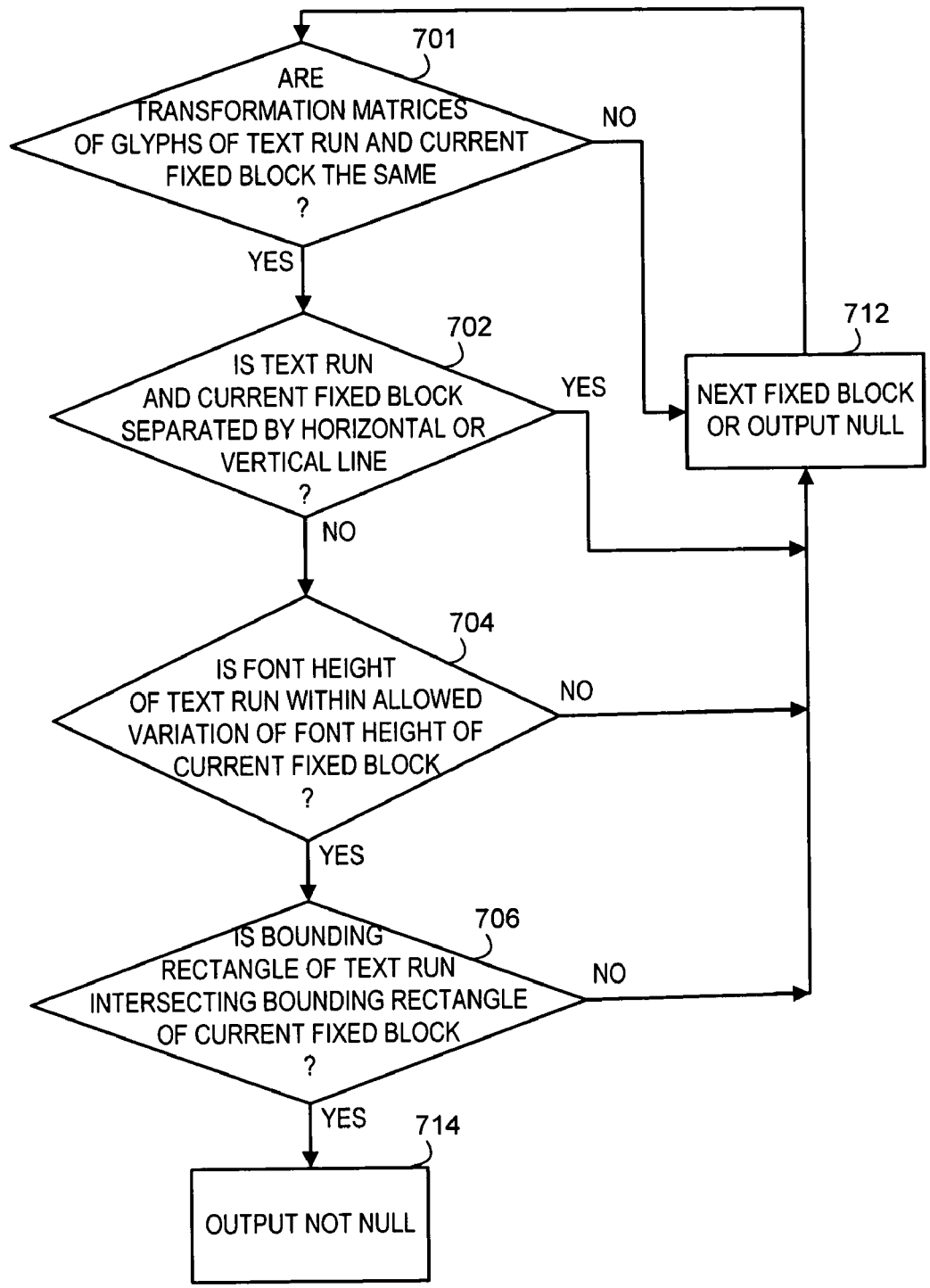
FIG. 7 shows an example of the operational flow for finding a corresponding fixed semantic block for a text run.

FIG. 7 shows one example of an operational flow that may be performed by the semantic object creator module in order to place text runs into corresponding semantic blocks that represent individual paragraphs of the original document. The operational flow of FIG. 7 represents the operations performed in block operation 308 of FIG. 3. Each iteration of the operational flow of FIG. 7 considers a current text run relative to each semantic block that currently has been created until the current text run is matched to an existing semantic block or until no more existing semantic blocks are available.

The operations begin at query operation 701 which detects whether there are any transformation matrices of glyphs of the current text run being considered that are the same as those of the current fixed semantic block being considered as specified by the markup. For example, if text of a glyph has been rotated by 45 degrees for a text run, then it is likely that the text run corresponds to a semantic block that includes text of glyphs that have been rotated by 45 degrees and not likely to correspond to a semantic block that does not include such rotated text. If the transformation matrices are not the same, then the operational flow proceeds to next operation 712.

When query operation 701 detects that the transformation matrices are the same, then query operation 702 determines whether a current text run being considered is separated from a current fixed semantic block being considered by either a horizontal or vertical line. The separation by a line is highly indicative of the text run not corresponding to the current fixed semantic block, and therefore if the separation by the line exists, then operational flow proceeds to next operation 712 where the next fixed semantic block to be considered for the current text block is accessed or if no additional semantic blocks are left, then a null output is produced.

When considering whether the text run is separated by a vertical or horizontal line from the semantic block, a determination is made based on attempting to locate a line specified in the markup. Particularly, it is determined whether the markup specifies that a line is present that has a coordinate position between the coordinate position of the text run and the coordinate position of the semantic block where those coordinate positions are a function of the coordinate positions of the glyphs belonging to the text run and the semantic block.

When query operation 702 finds that there is not a horizontal or vertical line creating a separation, then query operation 704 detects whether a font height of the current text run being considered is within an allowed variation of the font height of the current fixed semantic block being considered. While the variation that is allowed may vary from one implementation to another, a variation of 10 percent has been found to produce acceptable results. If the variation is greater than an allowed variation, then is indicative that the text run likely does not correspond to the paragraph represented by the current semantic block, and operational flow proceeds to next operation 712.

When query operation 704 finds that there is not a variation in font height beyond the allowed variation, then query operation 706 detects whether a bounding rectangle of the current text run being considered intersects a bounding rectangle of the current fixed semantic block being considered. In other words, query operation 706 is detecting whether the coordinate location of the text run as specified by the markup is close to that of the semantic block. The size of the bounding rectangle may be inflated by a constant relative to the size occupied by the text of the text run and the text of the semantic block so that the text of each is not required to be overlapping. While the amount of inflation of the bounding rectangle may vary from one implementation to the next, an inflation of 0.8 times the vertical dimension of the text run and a horizontal inflation of 3 times the em-width of the font size of the text run have been found to produce acceptable results. When the bounding rectangles are found not to intersect, the operational flow proceeds to next operation 712.

When query operation 706 finds that the bounding rectangles do intersect, then all checks for the current text run and the current fixed semantic block have been completed without reaching a conclusion that the text run does not belong to the current block. Accordingly, an output that is not null is generated at output operation 714, which results in the current text run being added to the current semantic block in FIG. 3. The operational flow of FIG. 7 may then be repeated for the next text run to be assigned to a semantic block.

Figure 8:
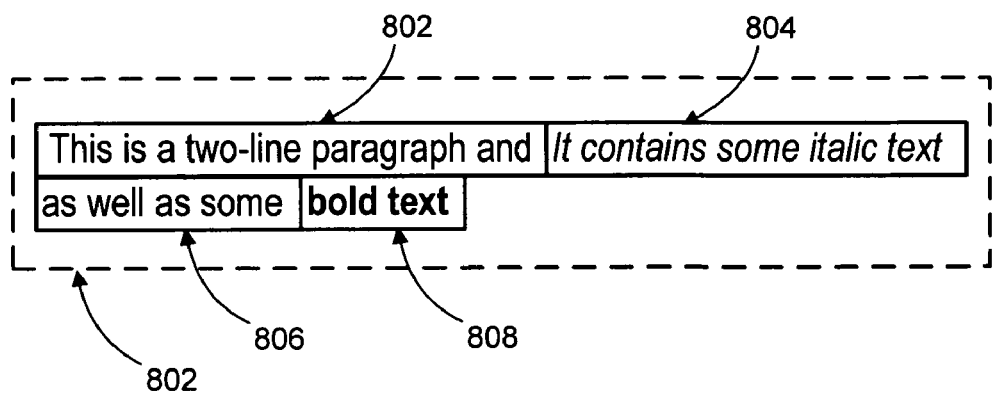
FIG. 8 shows an example of a paragraph broken into individual text runs.

Upon having created semantic blocks and having assigned text runs to those semantic blocks, the content within the semantic block must be ordered correctly. FIG. 8 shows an example of a fixed semantic block 800 that includes four text runs 802, 804, 806, and 808 where each text run corresponds to a glyph with a different style. FIG. 9 shows a portion of a markup that provides the content for the semantic block 802. As can be seen, the text runs of the semantic block 800 are a left-to-right (LTR) language. However, the markup 900 of FIG. 9 has an order that corresponds to a right-to-left (RTL) language. Accordingly, if the order of content for the semantic block 800 was taken to be the order of the markup, the text of glyph 902 would come first, followed by the text of glyph 904, then 906, and finally 908. Thus, selection of the text of this paragraph be ordered as "it contains some italic text This is a two line paragraph and bold text as well as some."

Figure 10:
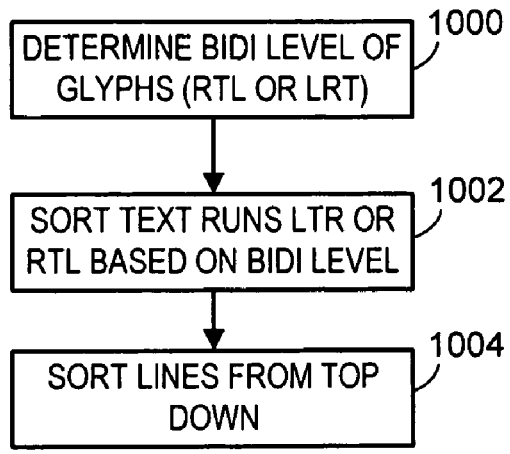
FIG. 10 shows an example of the operational flow for ordering the text runs that have been placed within a semantic block representing a paragraph.

FIG. 10 shows an example of an operational flow for ordering the content within each semantic block to avoid this result. The operational flow begins at bidi operation 1000 where the bidi level of the text runs of a semantic block are determined. There is a bidi level property on the Glyphs element, e.g. <Glyphs BidiLevel="1" . . . >. This property is a number. According to one embodiment, if the number is an even number, this implies LTR text while if it is odd, then this implies RTL text. Depending on what number it is, it could be used to denote multiple levels of nested bidi levels but a primary bidi level may be used for arrangement within the semantic block. If the BidiLevel property does not exist on the specific Glyphs element that is being processed for a text run, then the UnicodeString property which contains the text is considered. The Unicode code points implicitly indicate which script has been used for this Glyphs element, hence pointing out whether LTR or RTL. Once the bidi level is known, at sorting operation 1002 the text runs of each of the lines within the semantic block are then sorted in an LTR or RTL fashion depending upon the bidi level. At sorting operation 1004, the text lines of the semantic block are sorted from the top down as it is expected that the language used is read from top to bottom.

Figure 14:
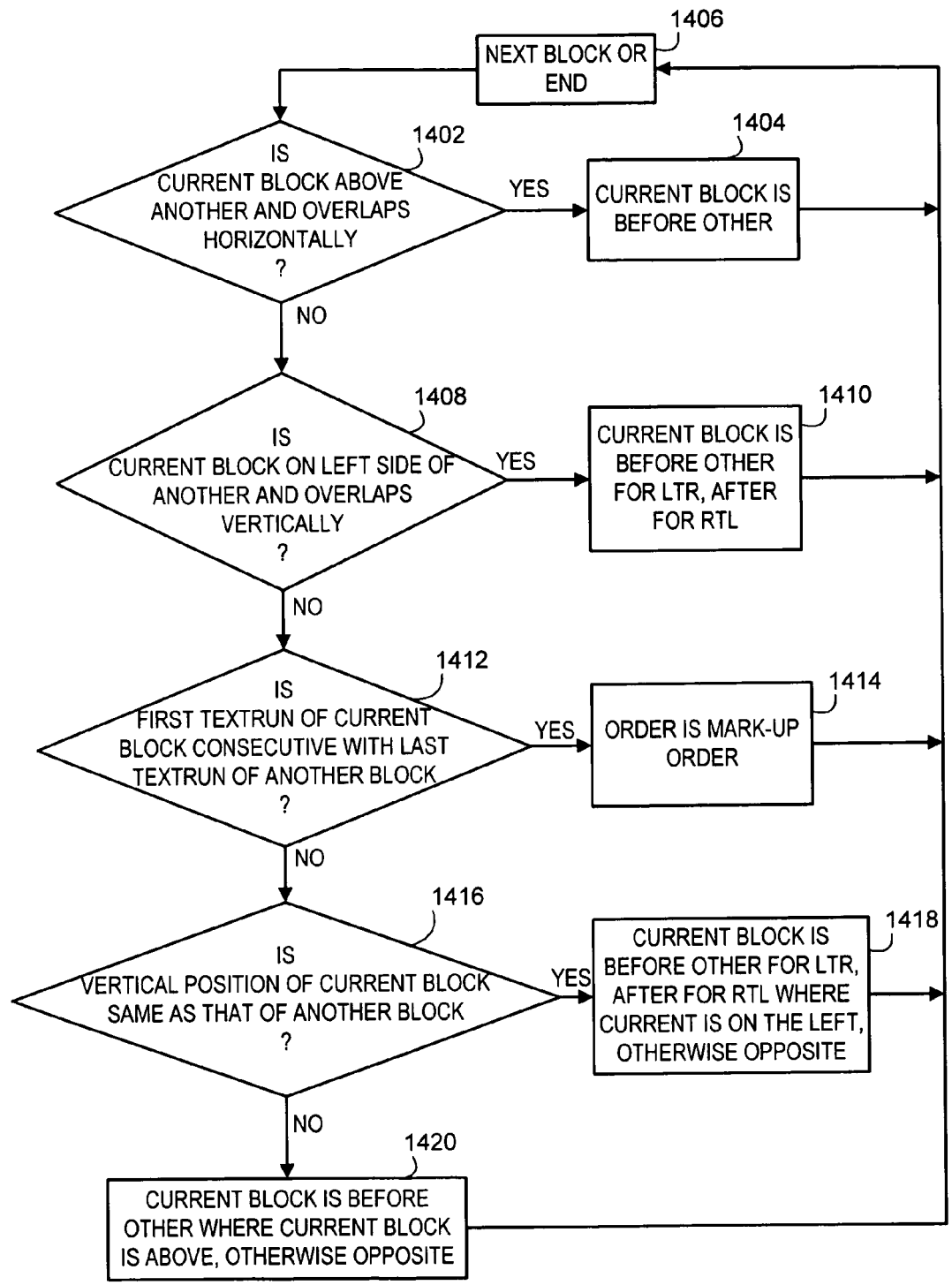
FIG. 14 shows an example of the operational flow for ordering the semantic blocks for the page represented by the semantic object.

Once the text runs within each semantic block are appropriately ordered, the semantic blocks themselves of a page of the original document must be ordered to properly correspond to the order of paragraphs of the original document. The operational flow for ordering the semantic blocks on the page is shown in FIG. 14 and is discussed in detail below. However, prior to discussing FIG. 14, some brief examples are shown.

Figure 11:
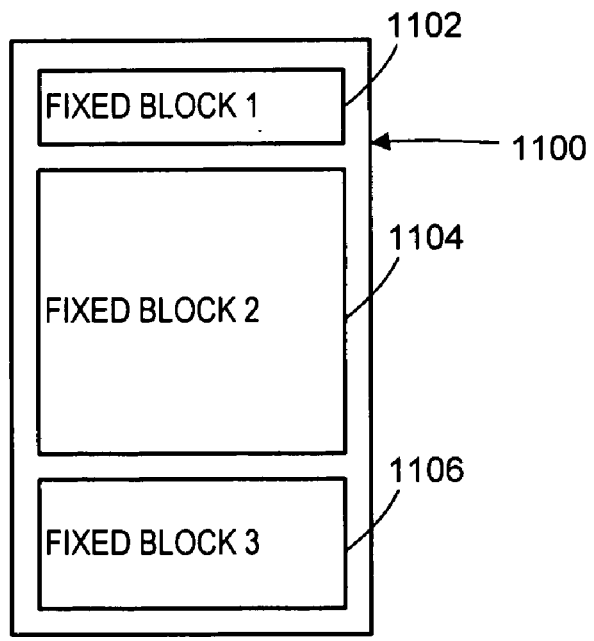
FIG. 11 shows a positioning of three fixed semantic blocks based upon an order of the markup language representation.

To account for pages that may have multiple columns, semantic blocks that are closely positioned may be stored as groups so as to keep these semantic blocks together during content ordering. A single group may correspond to a column of a page of the original document. FIG. 11 shows an example of a group 1100 that includes a first fixed semantic block 1102 as a first paragraph of a column, a second fixed semantic block 1104 as a second paragraph of the column, and a third fixed semantic block as a third paragraph of the column.

Figure 12:
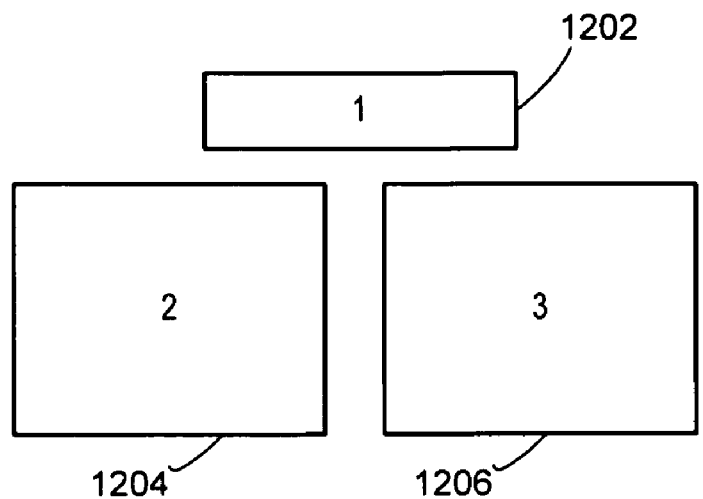
FIG. 12 shows a positioning of the three fixed semantic blocks based on coordinates specified within the markup language representation and a resulting order that is assigned within the semantic object.

FIG. 12 shows an example of the ordering of fixed blocks of a particular spatial configuration of the original document for an LTR language. Here, the topmost semantic block 1210 that also has the leftmost position is ordered as the first semantic block. As there are no more semantic blocks of the same vertical position of block 1210, the next topmost semantic block that has the leftmost position, or block 1204, is ordered as the second semantic block. Finally, in this example, the next semantic block of the same vertical position of block 1204 that is the next leftmost, or block 1206, is ordered as the third semantic block.

Figure 13:
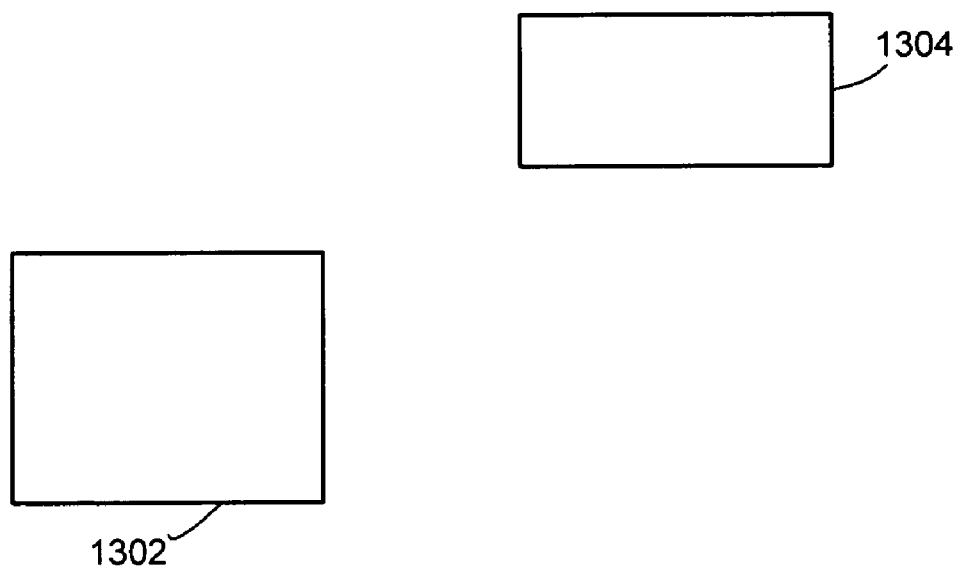
FIG. 13 shows a positioning of two fixed semantic blocks based on coordinates specified within the markup language representation which involves consideration of the markup order when ordering the semantic blocks for the page represented by the semantic object.

FIG. 13 shows an example of a situation where two semantic blocks do not align vertically or horizontally such that the order of the markup may be considered. This scenario is discussed below with reference to FIG. 14, where the markup order is considered and if inapplicable then an order is assigned based on a default rule.

In FIG. 14, the operations attempt to order the semantic blocks so that the resulting order of the semantic blocks matches the order of the paragraphs of the corresponding page of the original document. The operations of FIG. 14 are iterated for each semantic block relative to each of the other semantic blocks of the page until all semantic blocks have received their order designation.

At query operation 1402, it is detected whether the current block being considered is above another block. It is arbitrary as to which semantic block is the first to be considered and as to which other semantic block is the first to be considered in relation to the first semantic block being considered. Accordingly, the particular sorting routine implementation of a given embodiment may cycle through the semantic blocks by starting at any one of the semantic blocks that are present. If it is determined that the current block being considered is above the other and overlaps horizontally with the other block, then at order operation 1404 the current block is order before the other block. Then operational flow proceeds to next operation 1406 to move to the next block to be considered in relation to the current block so long as additional blocks have yet to be ordered.

When query operation 1402 finds that the current block is not above the other or does not overlap horizontally with it, then query operation 1408 detects whether the current block is on the left side of the other block and overlaps vertically with the other block. If so, then at order operation 1410 the current block is ordered before the other where the language is LTR and is order after the other block where the language is RTL.

When query operation 1408 finds that the current block is not on the left side or does not overlap vertically with the other block, then query a situation such as that of FIG. 13 is present. In that case, it may be necessary to consider the markup order. For this determination, operation 1410 detects whether the first text run of the current text block is consecutive with the last text run of the other text block, i.e., that no other information is spatially present between the first text run of the current block and the last text run of the other block. When that is the case, then order operation 1414 assigns the order of the block based on the markup order for the block relative to the other block.

When query operation 1412 finds that the first text run of the current block and the last text run of the other block are not consecutive, then query operation 1416 detects whether the vertical position of the current block is the same as that of the other block. If so, then order operation 1418 orders the current block ahead of the other block for LTR languages and after the other block for RTL languages where the current block is on the left of the other block, and if not on the left then the opposite order is assigned.

Where query operation 1416 finds that the vertical position is not the same, then order operation 1420 orders the current block ahead of the other block when the current block has a spatial location that is above that of the other block, and otherwise orders the current block after the other block.

Accordingly, once the order has been assigned in this manner for each of the blocks of the page, the iterations of the operational flow of FIG. 14 end and the semantic object is complete. At this point, the semantic object is available for use by the XPS markup viewer to allow for the logical order of the original document to be maintained when text is searched, selected, and copied.

While the invention has been particularly shown and described with reference to various embodiments thereof, it will be understood by those skilled in the art that various other changes in the form and details may be made therein without departing from the spirit and scope of the invention. For example, the particular order of the operational flow for assigning text runs to semantic blocks may vary. As another example the particular order of the operational flow for ordering semantic blocks may vary. Furthermore, variations in the heuristics involved may be applicable, such as the allowable variation in font height of a text run relative to a semantic block and the horizontal and vertical inflation of the text runs and semantic blocks.

What is claimed is:

1. A computer-implemented method of constructing an object model reflective of structure of a document, from an unstructured document, comprising:

scanning an unstructured markup language representation of the document for one or more markup language glyphs to generate a plurality of text runs, where the text runs comprise one or more semantically structured, selectable representations of the markup language glyphs;

creating one or more semantic block containers comprising text runs that correspond to a same semantic block by determining which text runs correspond to the same semantic block;

determining a logical structured order of the text runs within the respective one or more semantic blocks;

determining an order of the respective one or more semantic blocks in the document; and saving the semantic blocks comprising the order of the text runs and the order of the one or more semantic blocks in the document as the object model to generate a logically structured document comprising semantically structured, selectable representations of the markup language.

2. The method of claim 1, determining which text runs correspond to the same semantic block comprising determining whether blank lines are present as determined from the markup language representation.

3. The method of claim 1, determining which text runs correspond to the same semantic block comprising determining whether a font height of a first text run is within a desired variation of a font height of a second text runs in a current semantic block as determined from the markup language representation.

4. The method of claim 1, determining which text runs correspond to the same semantic block comprising determining whether a bounding rectangle of a current text run intersects a bounding rectangle of a current semantic block as determined from the markup language representation.

5. The method of claim 1, comprising at least one of:
determining whether two or more semantic blocks can be merged to form a single semantic block; and
determining whether one or more semantic blocks may be divided to form multiple semantic blocks.

6. The method of claim 1, determining which text runs correspond to the same semantic block comprising determining if there is a transformation matrix for a current text run determined from the markup language representation.

7. The method of claim 1, comprising creating a new semantic block container for a current text run when the current text run does not correspond to an existing semantic block.

8. The method of claim 1, determining the order of text runs within the semantic block comprising determining a bidi level and sorting text runs within the semantic block based on the bidi level.

9. The method of claim 8, determining the order of the text runs within the semantic block comprising sorting from top down as determined from the markup language representation.

10. The method of claim 1, determining the order of the semantic blocks in the document comprising:
if a first semantic block is not adjacent to the left of a second semantic block or does not overlap vertically with the second semantic block, determining whether the first text run of the first semantic block is consecutive with the last text run of the second semantic block;
if the first text run of the first semantic block is consecutive with the last text run of the second semantic block, ordering the first semantic block relative to the second semantic block based on an order of the markup language representation;
if the first text run of the first semantic block is not consecutive with the last text run of the second semantic block, determining whether a vertical position of the first block is a same vertical position of the second block;
if the vertical position of the first semantic block is the same as the vertical position of the second block, placing the first semantic block before the second semantic block in the document where the first semantic block and the second semantic block comprise left-to-right languages and placing the first semantic block after the second semantic block in the document where the first semantic block and the second semantic block comprise right-to-left languages; and
if the vertical position of the first semantic block is not the same as the vertical position of the second block, placing the first semantic block before the second semantic block in the document where the first semantic block is above the second semantic block in the document as determined from the markup language representation.

11. The method of claim 1, determining the order of the semantic blocks in the document comprising:
determining whether a first semantic block is above a second semantic block in the document and overlaps horizontally with the second semantic block as determined from the markup language representation;
if the first semantic block is above the second semantic block and overlaps horizontally with the second semantic block, placing the first semantic block before the second semantic block in the document;
if the first semantic block is either not above the other semantic block or does not overlap horizontally with the second semantic block, determining whether the first block is adjacent to the left of the second semantic block in the document and overlaps vertically with the second semantic block; and
if the first semantic block is adjacent to the left of the second semantic block and overlaps vertically with the second semantic block, placing the first semantic block before the second semantic block in the document where the first semantic block and the second semantic block comprise left-to-right languages and placing the first semantic block after the second semantic block in the document where both the first semantic block and the second semantic block comprise right-to-left languages.

12. A non-transient computer-readable storage medium having computer-executable instructions, for generating a logically structured document from an unstructured document, that when executed on a computer via a microprocessor perform a method comprising:
obtaining text runs from an unstructured markup language representation of a document, comprising a paper specification format, where the text runs comprise one or more representations of markup language glyphs;
constructing semantic block containers by determining which text runs correspond to same semantic blocks and placing those text runs corresponding to the same semantic block into the same semantic block container;
ordering the text runs within respective semantic blocks to match a logical order present in the document; and
ordering the semantic blocks to match a logical order present in the document to generate a structured markup language representation of the document, comprising selectable text.

13. The non-transient computer readable medium of claim 12, constructing the semantic block containers comprising:
determining whether a current text block corresponds to an existing semantic block; and
creating a new semantic block to include the current text run, if the current text block does not correspond to the existing semantic block.

14. The non-transient computer readable medium of claim 12, determining whether a current text block corresponds to the existing semantic block comprising:
determining whether the current text run is separated by a horizontal or vertical line from the current semantic block;

determining whether the current text run has a font height within a desired variation from the font height of the current semantic block, if the current text run is not separated by a horizontal or vertical line from a current semantic block;

determining whether a bounding rectangle of the current text run intersects a bounding rectangle of the current semantic block, if the current text run has a font height within a desired variation from the font height of the current semantic block;

determining whether the current text run starts on a same horizontal location of the current semantic block and comprises a width smaller than a gap on a last line of the current semantic block, if the bounding rectangle of the current text run intersects the bounding rectangle of the current semantic block;

determining whether a transformation matrix applicable to the current text run is also applicable to the current semantic block, if the current text run does not start on the same horizontal location of the current semantic block and does not comprises a width smaller than the gap on the last line of the current semantic block; and placing the current text run in the semantic block container corresponding to the current semantic block, if a transformation matrix that is applicable to the current text run is also applicable to the current semantic block.

15. A computer-based system, comprising:

storage containing instructions for generating a semantic object and containing a markup language representation of a document; and a processor that implements the instructions to generate the semantic object, wherein implementing the instructions comprises:
    accessing the markup language representation to produce text runs, where the text runs comprise one or more representations of markup language glyphs;
    placing the text runs into corresponding semantic blocks in accordance with a logical structure of the document comprising:
        determining whether any transformation matrices applicable to a current text run are also applicable to a current semantic block, if so, determining whether the current text run is separated by a horizontal or vertical line from the current semantic block, if not, determining whether the current text run has a font height within an desired variation from the font height of the current semantic block, if so, determining whether a bounding rectangle of the current text run intersects a bounding rectangle of the current semantic block, if so, placing the current text run in the semantic block container corresponding to the current semantic block;
    ordering the text runs within the semantic blocks in accordance with the logical structure of the document;
    ordering the semantic blocks to form one or more pages in accordance with the logical structure of the document; and
    storing the ordered semantic blocks containing the order text runs as the semantic object.

16. The system of claim 15, comprising a system for generating a logically structured document, comprising selectable extensible markup language representations of the document, from an unstructured document, comprising an extensible markup language paper specification format representation of the document.

17. The system of claim 15, the processor implements the instructions to order the text runs within the semantic blocks by performing the following:
    determining a bidi level and sorting text runs within the semantic block based on the bidi level; and
    sorting from top down as determined from the markup language representation.

18. The system of claim 15, the processor implements the instructions to generate one or more new semantic blocks when text runs are not placed in an existing semantic block.

19. The computer system of claim 15, the processor implements the instructions to order the semantic blocks by performing the following:
    determining whether a current semantic block is positioned above another semantic block in the document and overlaps horizontally with the other semantic block as determined from the markup language representation;
    if the current semantic block is positioned above the other semantic block in the document and overlaps horizontally with the other semantic block, placing the current semantic block before the other semantic block in the document;
    if the current semantic block is either not positioned above the other semantic block in the document or does not overlap horizontally with the other semantic block, determining whether the current block is on the left side of the other semantic block in the document and overlaps vertically with the other semantic block; and
    if the current semantic block is on the left side of the other semantic block in the document and overlaps vertically with the other semantic block, placing the current semantic block before the other semantic block in the document where the current semantic block and the other semantic block are left-to-right languages and placing the current semantic block after the other semantic block in the document where both the current semantic block and the other semantic block are right-to-left languages.

20. The system of claim 19, the processor implements the instructions to order the semantic blocks by performing the following:
    if the current semantic block is not on the left side of the other semantic block in the document or does not overlap vertically with the other semantic block, determining whether the first text run of the current semantic block is consecutive with the last text run of the other semantic block;
    if the first text run of the current semantic block is consecutive with the last text run of the other semantic block, ordering the current semantic block relative to the other semantic block based on the order of the markup language representation;
    if the first text run of the current semantic block is not consecutive with the last text run of the other semantic block, determining whether a vertical position of the current block is a same vertical position as the other block;
    if the vertical position of the current semantic block is the same vertical position as the other block, placing the current semantic block before the other semantic block in the document where the current semantic block and the other semantic block are left-to-right languages and placing the current semantic block after the other semantic block in the document where the current semantic block and the other semantic block are right-to-left languages; and if the vertical position of the current semantic block is not the same vertical position as the other block, placing the current semantic block before the other semantic block in the document where the current semantic block is above the other semantic block in the document as determined from the markup language representation.

* * * * *